April 8, 1958     S. W. BUXTON ET AL     2,829,534
HOODED HANDLEBAR LEVERS

Filed Nov. 1, 1955     2 Sheets-Sheet 1

Inventors
Sidney W. Buxton, Alan P. Oakley,
and Harry Letherland
by    *[signature]*
               Attorney April 8, 1958 S. W. BUXTON ET AL 2,829,534
HOODED HANDLEBAR LEVERS
Filed Nov. 1, 1955 2 Sheets-Sheet 2

Inventors
Sidney W. Buxton, Alan P. Oakley,
and Harry Letherland
by
Attorney

United States Patent Office 2,829,534
Patented Apr. 8, 1958

2,829,534

HOODED HANDLEBAR LEVERS

Sidney Walter Buxton, Nuthall, and Alan Philip Oakley and Harry Letherland, Bramcote, England, assignors to The Raleigh Cycle Company Limited, a British company Application November 1, 1955, Serial No. 544,286

Claims priority, application Great Britain November 3, 1954

3 Claims. (Cl. 74—488)

This invention relates to handlebar levers used generally to operate calliper type cable-actuated brakes.

This brake lever assembly is of the type now popularly known as the "hooded" type, in which the brake lever is pivoted in a fulcrum, the latter being of such a shape as to enable the rider to use it when riding in an upright position, his hands resting on this suitably shaped hooded fulcrum.

The most successful type of hooded lever produced so far has been the light alloy cast or die-cast type, which gives the necessary width and permits the countersinking and shielding of the lever fulcrum, pivots, etc. There have been produced a few steel variations of this hooded lever, but which do not fully fulfil the original purpose of the hood design, as in every case the fulcrum bolt has both its head and nut fully exposed and also the clip bolt for securing the lever to the handlebar.

The main object of the present invention has been to evolve a construction of hooded lever from sheet steel. Preferably the fulcrum pin of the brake lever and also the bolt which attaches the lever to the handlebar are entirely concealed but the basic problem of producing such a lever from sheet metal is to prevent the seam from opening and in previous attempts as aforesaid the fulcrum pin has been constructed as a bolt to enable it to perform this further function.

According to the present invention a hooded handlebar lever of the kind comprising a hood-like bracket, means for securing the bracket to a handlebar and a lever having one end pivotally mounted within said bracket is characterised in that the bracket is made of sheet metal with a butt seam and in that the means for securing the bracket to the handlebar includes a further box-like part located within the hood-like bracket and carrying both the pivot for the lever and the fixing screw, the bracket having inwardly directed tongues forming clip tensioning abutments for said box-like part, the seamed portion of the said further box-like part being embraced by a seamless U-shaped part of the bracket and the seamed part of the bracket being complementary to a seamless U-shaped part of the said inner box-like part, said box-like part and said bracket having complementary inter-engaging formations adapted to secure the seam of the bracket against opening.

The hooded handlebar lever aforesaid may be further characterised in that the said further part constitutes a pivot carrier with the pivot ends enclosed by the bracket; or further characterised in that the pivot carrier is itself a sheet metal pressing of box-like shape having a seamless wall complementary to a seamed wall of the bracket and vice versa, whereby the hood-like bracket also prevents opening of the seam in the pivot carrier.

Figure 1:
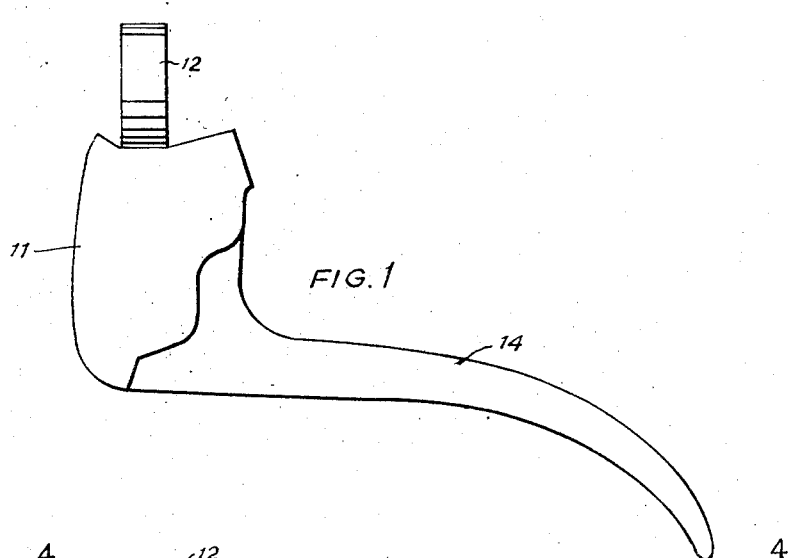
Figure 1 is a side elevation of one example of a hooded handlebar brake lever for a bicycle, made in accordance with the invention.
Figure 2:
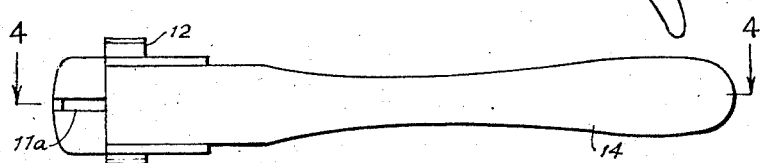
Figure 2 is a plan of Figure 1.
Figure 4:
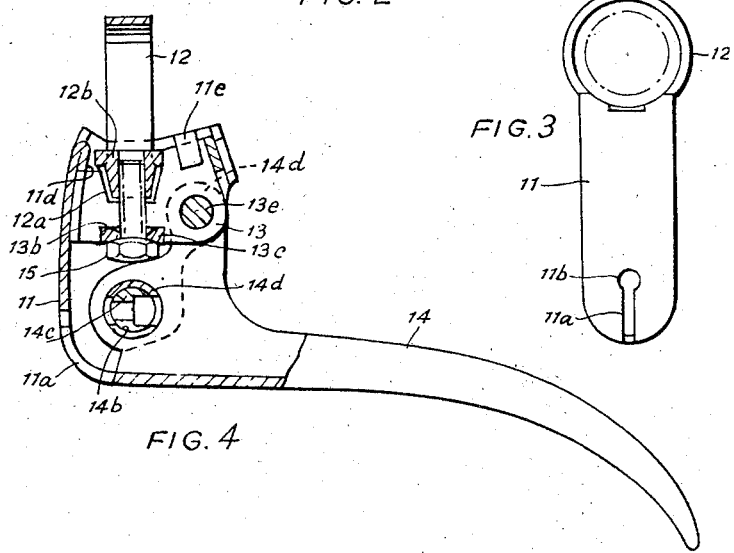
Figure 4 is a sectional side elevation on line 4—4 of Figure 2.
Figure 3:
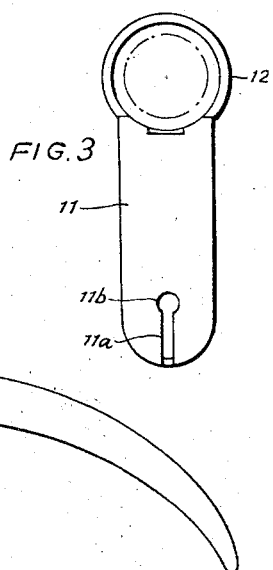
Figure 3 is a front elevation of Figure 1.
Figure 5:
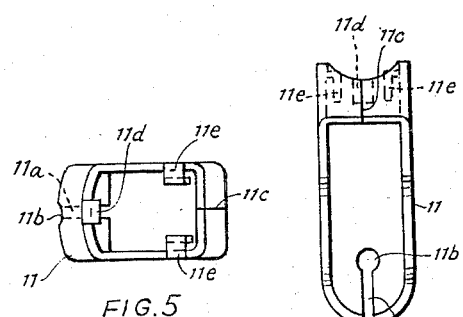
Figures 5 and 6 are underneath and rear views of the hooded bracket.
Figure 6:
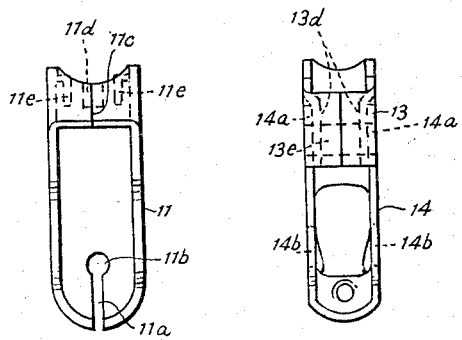
Figure 7:
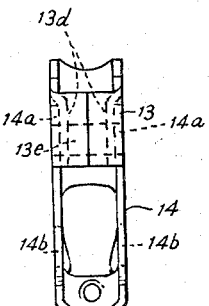
Figures 7 and 8 are front elevation and plan of the assembled lever and pivot carrier.
Figure 8:
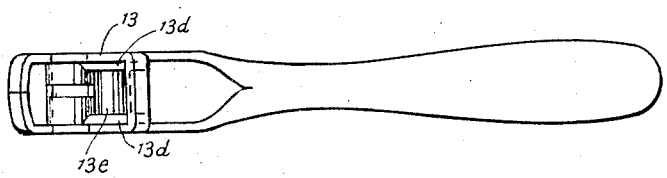
Figure 9:
Figure 9 is a side elevation of the cable anchorage pivot.
Figure 10:
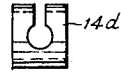
Figure 10 is a side elevation of a locating sleeve for the cable anchorage pivot.
Figure 11:
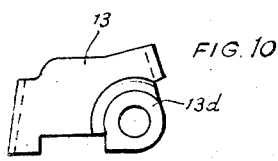
Figures 11 and 12 are side elevation and plan of the pivot carrier.
Figure 12:
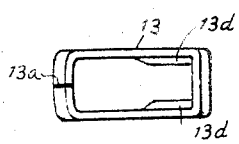

As shown in the drawings, the hooded handlebar brake lever for a bicycle comprises a bracket 11, a clip 12 for fixing the bracket to a tubular handlebar, a pivot carrier 13, a lever 14 and a single fixing screw 15.

The bracket 11 is a steel pressing made from a sheet metal blank. It is of box-like shape having a key-hole shaped slot 11a in its hood-like upper part adapted to receive and hold a socket 11b for the end of the flexible casing of a flexible cable-and-casing actuating mechanism. The seam of the pressing is located at 11c in the rear wall of the box-like shape, while the lower edge is shaped in known manner to seat effectively on a tubular member, whether straight or curved. At such lower end of the box-like formation there is provided a front inwardly and upwardly turned tongue 11d and two side inwardly and upwardly turned tongues 11e, the function of which will be described later.

The clip 12 is a steel pressing, the ends 12a of which are shaped and bent to receive and house a T-shaped nut 12b.

The pivot carrier 13 is also a steel pressing of box-like shape having its seam 13a at the front. The upper edge is notched at 13b to locate a washer 13c for the single fixing screw 15. At the rear upper edge the pivot carrier is pressed in at 13d to form a pair of recesses in the centre of which is a hole for a pivot pin 13e which is a sliding fit therein. The pivot carrier is adapted to slide into the bracket 11 from above and to be located therein by engagement with the front tongue 11d and with the side tongues 11e which latter engage it near the angle of the rear wall of the pressing.

The lever 14 is also a steel pressing and has a pair of depending lugs 14a formed with a hole to receive the pivot pin and adapted to lie in the inwardly pressed portions 13d of the pivot carrier. The said inward pressing is such that the outer faces of the said lugs 14a lie substantially flush with the outer side faces of the pivot carrier. At the forward end, the lever is formed with holes 14b to receive a cylindrical nipple holder 14c on which is located a sleeve 14d. The nipple holder and sleeve are slotted as shown to receive and hold the usual nipple provided on the end of an actuating cable, which nipple when in position holds the sleeve against sliding movement relative to the nipple holder and therefore retains the nipple holder in the lever by positioning it against axial movement.

In use, as can be seen from the drawings, there are no projections from the hood, even the pivot for the lever being within the bracket. Assembly is extremely simple. Firstly the pivot carrier is connected to the end of the lever by bringing the two parts together and sliding the pivot through the complementary pivot holes therein. The ends of the pivot finish flush with the outer faces of the lugs on the lever so that the pivot carrier may be inserted through the top of the bracket in which it is an easy sliding fit against the sides. When the pivot carrier has been pushed down inside the bracket as far as it will go, the seamed front end of the carrier rests on the front tongue 11d while the tongues 11e on the bracket are located inside the pivot carrier near the unseamed front thereof. The lever may then be secured to a bicycle handlebar by means of the single screw 15 with its washer 13c and the clip 12 with its nut 12b, such single fixing screw 15 serving both to tighten the clip and bracket against the handlebar tube but also to hold the pivot carrier 13 into the bracket. In such position any force tending to expand the bracket at its seam 11c is resisted by the embrace of the tongues 11e within the unseamed end of the pivot carrier 13. Similarly the pivot carrier is prevented from opening at its front seat 13a by the embrace of the unseamed front end of the bracket 11. The ends of the clip 12 are located within the pivot carrier with its ends against the sides thereof so that in turn such ends are prevented from opening to release the nut under any force resulting from tightening of the fixing screw or actuation of the lever.

We claim:

1. A hooded handlebar lever of the kind comprising a hood-like bracket of box-like shape and of sheet metal seamed tubular construction, a lever having one end pivotally mounted within the bracket, and means for securing the bracket to a handlebar including a band adapted to encircle the bar and screw means within the bracket for pulling the band into the bracket, characterised by a further box-like part made of sheet metal seamed tubular construction closely fitting within the bracket and carrying both the pivot for the lever and the fixing screw aforesaid, the bracket having inwardly directed projections forming clip-tensioning tongues for said further box-like part, the seamed portion of the said further box-like part being embraced by a seamless U-shaped part of the bracket and the seamed part of the bracket being complementary to a seamless U-shaped part of the said inner box-like part.

2. A hooded handlebar lever according to claim 1 further characterised in that the seam of the hood-like bracket is to the rear and in that said bracket is formed with said tongues inwardly directed and adjacent said seam in inter-engagement with the pivot carrier to provide abutment resistance to opening of the seam.

3. A hooded handlebar lever according to claim 2 further characterised in that the tongues on the hood-like bracket are on the side wall thereof and are normally located within the pivot carrier near the unseamed front face thereof.

References Cited in the file of this patent

UNITED STATES PATENTS

| | | |
|---|---|---|
| 1,170,850 | Rosenburgh | Feb. 8, 1916 |
| 1,450,091 | Lard | Mar. 27, 1923 |
| 2,237,581 | Schwinn | Apr. 8, 1941 |

FOREIGN PATENTS

| | | |
|---|---|---|
| 1,041,731 | France | June 6, 1952 |